United States Patent Office 3,231,632
Patented Jan. 25, 1966

3,231,632
SEPARATION OF ISOBUTENE FROM MIXED BUTENES
Hans R. Friedli, Midland, Mich., and Otis C. Taylor, Lake Jackson, Tex., assignors to The Dow Chemical Company, Midland, Mich., a corporation of Delaware
No Drawing. Filed July 18, 1962, Ser. No. 210,188
3 Claims. (Cl. 260—677)

This invention relates to a new process for the separation of gaseous olefinic hydrocarbons and it relates more particularly to a process for separating isobutene from mixed butenes.

Because of the narrow temperature range in which the boiling points of the $C_4$ hydrocarbons fall, the separation of individual compounds from mixtures of these by simple distillation is a difficult and sometimes an impossible proposition. This is particularly true of the separation of isobutene from mixed butenes. In the past this separation has been accomplished by both physical and chemical methods, comprising extractive distillation, selective adsorption or complexing, catalytic selective polymerization of isobutene and subsequent depolymerization, and selective absorption in sulfuric acid of a suitable concentration. The latter method is commonly used on a commercial scale and although it is an effective process, it has a number of disadvantages. Chief among these are the highly corrosive nature of the sulfuric acid used and the problems of alcohol and polymer formation during the process. The absorbed isobutene is liberated from the acid solution by diluting it with water and a reconcentration unit is necessary in order to recycle the acid.

The principal object of the present invention is to provide a simplified and efficient method for separating isobutene from its mixtures with other butenes. Another object is to make available isobutene of a high degree of purity. These and associated objects as are apparent from the detailed description which follows are attained by the practice of the present invention. Briefly stated, it has been found that isobutene can be separated efficiently from mixed butenes by a process which comprises intimately contacting such mixtures in the gaseous phase with an acid solution consisting essentially of from about 85% to about 99% by weight of a lower alkanoic acid and from about 15% to about 1% by weight of a strong acid, thereby causing selective esterification of at least a substantial part of the isobutene present, separating the unreacted gases from the acid mixture, and heating the acid mixture at about 50° to about 100° C. under subatmospheric pressure, thereby decomposing the tert-butyl ester present and liberating free isobutene. Although it is known that olefins in general can be reacted with organic acids in the presence of a suitable acidic catalyst to make the corresponding esters, it has now been found that isobutene is esterified to the practical exclusion of other lower olefins when mixtures of these are contacted in the gaseous phase with an acid solution such as described under equilibrium conditions. Surprisingly, high selectivity is obtained only by such gas-liquid contact and little or no selective esterification is found when such hydrocarbon mixtures are so reacted as liquids.

Highly selective and complete reaction of isobutene is found even when isobutene is present in the gas mixture as a minor component and the process is therefore applicable to hydrocarbon streams of widely varying isobutene content. It is most advantageously applied to such mixtures which contain substantial portions of isobutene, for example, from 10–80% by weight, when separation of pure isobutene is the main objective. The process may also be used to purify hydrocarbon streams by removing small quantities of isobutene.

By this process, the disadvantages of previously known methods for the separation are avoided or minimized. The absorption is highly selective, the solution used is non-corrosive in comparison to sulfuric acid, and the acid solution can be recycled directly with no need for reconcentration. The recoveries of isobutene are high with little polymer formation and with suitably adjusted conditions, essentially pure isobutene is obtained as the product. Only moderate temperatures and pressures are required in the operation.

The lower alkanoic acids suitable for use in the process are those having 1–4 carbon atoms in the molecule, i.e. formic, acetic, propionic, and butyric acids. Although formic acid is operable in the process, its use has obvious practical disadvantages. Acetic acid is preferred.

The strong acid component is an acid of sufficient strength to cause rapid esterification and it may be described generally as one having an ionization constant K at 25° C. such that $-\log K$ is less than one. Such acids include sulfuric acid, toluene sulfonic acid, boron trifluoride, hydrochloric acid, perchloric acid, trifluoroacetic acid, and trichloroacetic acid. Preferably, the particular acid used has a relatively low volatility. Mixtures of such acids may be employed. A preferred acid for the purpose is sulfuric acid. The acid solution is best maintained in a substantially anhydrous state and for this purpose a small amount of alkanoic acid anhydride, for example, acetic anhydride or propionic anhydride, may be added when the solution is made up. From 0.1% to about 2% by weight of anhydride may therefore be included in the acid absorption solution.

While an acid solution containing from 1% to 15% by weight of strong acid is selective and gives good results, best results are usually obtained when 5–10% of strong acid is used.

The proportion of acid absorption solution to hydrocarbon is not critical. Preferably at least one mole of alkanoic acid is employed per mole of isobutene and the process is most conveniently operated with about 4–20 moles of alkanoic acid per mole of isobutene.

The gaseous hydrocarbon stream may be contacted with the absorption solution by any of suitable known means for carrying out this type of operation. For example, a flooded countercurrent extraction tower may be used. Faster and more efficient contact is obtainable by use of a jet stream mixing system. Depending upon the type of device used for this step as well as other operating conditions, the average contact time in the absorber may run from a few seconds to one or two minutes.

The absorption step is carried out at about or somewhat above normal room temperature, that is, at about 20° C. to about 50° C., and preferably at 25–35° C. Higher temperatures result in increased instability of the tertiary butyl ester formed and in extensive polymerization of all the butenes. Lower temperatures give undesirably higher solubilities of the hydrocarbons in the absorption solution. The absorber is operated under atmospheric or near atmospheric pressure. It is usually most convenient to run this step under about 1–5 lbs./sq. in. gauge pressure. Pressures above about 10 lbs. gauge are undesirable in that increased solubility of the hydrocarbon stream in the absorption solution results.

The vent gas from the absorber is essentially free of isobutene and consists of isomeric butenes and butanes present in the original stream. The enriched absorption solution may be freed of dissolved butanes and butenes other than isobutene by running it through a stripper column operated at about the temperature of the absorber and maintained under reduced pressure, suitably at about 100–300 mm. of Hg. An inert purge gas such as nitrogen may be employed in this step. Alternatively, the unreacted dissolved gases may be stripped by introducing part of the pure isobutene product stream into the bottom of the absorption column, the mixed isobutenes then being introduced near the middle of the column.

The decomposition or desorption step wherein the tert-butyl ester present in the acid mixture is decomposed to reform isobutene and acid is accomplished merely by heating the mixture at about 50° C. to about 100° C., preferably at about 70–80° C. In the presence of acid at these temperatures, the tert-butyl ester is unstable and readily decomposes while any sec-butyl ester which may have formed remains essentially unchanged. In order to avoid polymerization of the isobutene as it is liberated, this step is carried out under reduced pressure, preferably at about 40–250 mm. Hg absolute. Under these conditions, substantially all of the esterified isobutene is recovered in high purity. The remaining acid solution can then be recycled directly to the process.

Example 1 is illustrative of operation within the above-described conditions.

EXAMPLE 1

An absorption column of about 1.1 liters volume was filled with a mixture of about 90% by weight acetic acid and 10% by weight of sulfuric acid. The mixture also contained about 1% of acetic anhydride which served to maintain anhydrous conditions. As hydrocarbon feed there was used a stream of gaseous mixed butenes and butanes having the composition as follows, the percentages being by weight: 0.8% propene, 0.2% propane, 3.0% isobutane, 9.7% butane, 25.6% isobutene, 34.3% butene-1, and 24.6% butene-2. The remaining 1.8% of the mixture was largely air. This gas mixture was sparged into the bottom of the column at the rate of 78.2 g. per hour, the effluent scrubbed gas being taken off at the top of the column. The acetic acid sulfuric acid solution was fed into the top of the absorption column at the rate of 432 g. per hour, and the enriched solution passed from the bottom of the column to a stripper system where dissolved gases were removed by an inert gas purge. After the absorption process had been run several hours at 25–30° C. and an equilibrium established, the column outlet flows were as follows:

Vent gas—40.2 g./hr. (0.48 g./hr. isobutene)
Enriched acid solution—470 g./hr.

The enriched acid solution contained at this point a total of 19.4 g./hr. of isobutene, 86.1% of which was contained as tert-butyl acetate and the rest was present as diisobutylene and the sulfuric acid half ester.

The enriched solution was fed continuously into a stripper column in which the $C_4$ partial pressure was maintained at 150 mm. Hg by using nitrogen as a stripper gas. The stripper effluent solution was free of dissolved gases and amounted to 440 g./hr. The stripped gas (23.0 g./hr.) consisted largely of butene and butanes with a small amount of isobutene formed by the decomposition of a little tert-butyl acetate in the stripper column.

The stripper effluent solution was distilled batchwise at 50 mm. Hg and 50–60° C. pot temperature. By this operation, better than 93% of the tert-butyl acetate content was decomposed into isobutene and acetic acid with essentially no formation of diisobutylene. The isobutene thereby obtained was of high purity, for the small amount of sec-butyl acetate present was stable under these conditions and no straight chain butenes were formed. The acetic acid solution resulting from the decomposition step was suitable for recycling to the process.

Because the tertiary butyl ester is unstable in the presence of the acid absorption solution, it is best carried through the remainder of the process without prolonged delay. The data listed in Table I show results obtained when liquid samples taken from the absorber and from the stripper were allowed to stand for 16 hours at room temperature and atmospheric pressure. The process sampled was being operated substantially as shown in Example 1 and the values given represent the weight percent of each component.

Table I

| Component | Equilibrium Samples | | Samples After Standing | |
|---|---|---|---|---|
| | Absorber | Stripper | Absorber | Stripper |
| tert-Butyl acetate | 3.6 | 3.0 | 2.2 | 2.2 |
| sec-Butyl acetate | 0.23 | 0.4 | 1.7 | 0.4 |
| Diisobutylene | 0 | 0 | 0.4 | 0.4 |

These data show that the tert-butyl acetate decomposes to form diisobutylene while dissolved butenes react to form sec-butyl acetate. This latter compound is stable in the acid solution as indicated by the fact that its concentration remains constant in the absence of dissolved gases.

EXAMPLE 2

A continuous apparatus designed to produce isobutene of particularly high purity employs an absorber column wherein the mixed hydrocarbon feed is introduced at or near its midpoint, an acetic acid-sulfuric acid mixture such as used in Example 1 is fed in at the top of the column, and substantially pure isobutene is introduced near the bottom of the column. Vent gas essentially free of isobutene is released at the top of the column and the acid—tert-butyl acetate mixture is drawn off at the bottom. The column is operated at 25–35° C. under about 2–5 lbs. gauge pressure and flow rates are adjusted so that the residence time of liquid in the column is about 10–30 minutes, the contact time of the gas in the column is about ½ to about 1½ minutes, and approximately 9–16 lbs. of acid mixture are used per pound of isobutene. The acid—tert-butyl acetate mixture passes from the absorber to a decomposition reactor, preferably a tower or column operated at 70–80° C. and at 150–200 mm. Hg absolute pressure. From this reactor, acid mixture substantially free of ester is drawn off and recycled to the absorber while gaseous isobutene is released at the top of the reactor. This isobutene product is of 99% or better purity. A portion of the isobutene stream is recycled to the absorber.

Results similar to the foregoing are obtained by using lower alkanoic acids other than acetic acid in the absorption solution or by replacing the sulfuric acid with another strong acid capable of catalyzing the reaction of isobutene with lower alkanoic acid, the process conditions being as specified above.

We claim:

1. A process for separating isobutene from a hydrocarbon mixture comprising isobutene and normal butenes which comprises intimately contacting said mixture in the gaseous state at about 20° C. to about 50° C. with a liquid acid mixture consisting essentially of about 85% to about 99% by weight of acetic acid and about 15% to about 1% of sulfuric acid for a length of time sufficient to esterify at least a substantial portion of the isobutene present, separating the unreacted hydrocarbons from the liquid acid mixture thereby formed, and heating the liquid acid mixture at about 50° to about 100° C. under subatmospheric pressure, thereby liberating free isobutene.

2. The process of claim 1 wherein separating the unreacted hydrocarbons from the acid mixture comprises a purge of said acid mixture with gaseous isobutene.

3. The process of claim 1 wherein the acid solution additionally contains 0.1–2.0% by weight of acetic anhydride.

(References on following page)

References Cited by the Examiner

UNITED STATES PATENTS

| | | | |
|---|---|---|---|
| 2,041,193 | 5/1936 | Lee | 260—497 |
| 2,741,632 | 4/1956 | Cottle | 260—497 |
| 2,981,767 | 4/1961 | Gay | 260—677 |
| 3,026,362 | 3/1962 | McKeever | 260—677 |
| 3,055,934 | 9/1962 | Heisler et al. | 260—677 |
| 3,068,305 | 12/1962 | Heisler et al. | 260—677 |
| 3,130,242 | 4/1964 | Platz et al. | 260—677 |

ALPHONSO D. SULLIVAN, *Primary Examiner.*

PAUL M. COUGHLAN, *Examiner.*